United States Patent
Tanaka et al.

[11] Patent Number: 5,653,647
[45] Date of Patent: Aug. 5, 1997

[54] SOLID GOLF BALL

[75] Inventors: Hiroaki Tanaka, Kobe; Kouhei Takemura, Nara, both of Japan

[73] Assignee: Sumitomo Rubber Industries, Ltd., Hyogo-ken, Japan

[21] Appl. No.: 568,369

[22] Filed: Dec. 6, 1995

[30] Foreign Application Priority Data

Dec. 6, 1994 [JP] Japan .................. 6-330760

[51] Int. Cl.$^6$ ................................. A63B 37/02
[52] U.S. Cl. ........................... 473/377; 473/372
[58] Field of Search ............... 473/372, 367, 473/371, 377; 273/235 R, 218

[56] References Cited

U.S. PATENT DOCUMENTS

| | | | |
|---|---|---|---|
| 4,683,257 | 7/1987 | Kakiuchi et al. | 473/372 |
| 5,215,308 | 6/1993 | Hiraoka et al. | 473/372 |
| 5,222,739 | 6/1993 | Horiuchi et al. | 473/372 |
| 5,304,608 | 4/1994 | Yabuki et al. | 473/372 |

FOREIGN PATENT DOCUMENTS 5-123422  5/1993  Japan.

*Primary Examiner*—Mark S. Graham
*Attorney, Agent, or Firm*—Birch, Stewart, Kolasch & Birch, LLP

[57] ABSTRACT

The present invention provides a golf ball having small impact force when hitting, good shot feel and excellent flight performances. The solid golf ball of the present invention comprises a core and a cover covering the core, wherein the core is obtained from a rubber composition comprising 100 parts by weight of cis-1,4-polybutadiene and 10 to 25 parts by weight of a metal salt of an unsaturated carboxylic acid, the core has a deformation of 3.5 to 6.5 mm when a weight load from an initial loading of 10 kg to a final loading 130 kg is applied to the core, and the cover has a stiffness modulus of 4,500 to 6,000 kg/cm$^2$ at 23° C. and a thickness of 3.2 to 5 mm.

9 Claims, 1 Drawing Sheet

SOLID GOLF BALL

FIELD OF THE INVENTION

The present invention relates to a solid golf ball. More particularly, it relates to a solid golf ball having a small impact force when hitting, good shot feel (feel when hitting) and excellent flight performances.

BACKGROUND OF THE INVENTION

A golf ball is mainly composed of a core and a cover covering the core, and an ionomer resin is mainly used as a base resin of the cover. Generally, the ionomer resin is an ionic copolymer of either three monomers, such as α-olefin, α,β-ethylenically unsaturated carboxylic acid and metal α,β-ethylenically unsaturated carboxylate, or four monomers such as α-olefin, α,β-ethylenically unsaturated carboxylic acid, metal α,β-ethylenically unsaturated carboxylate and α,β-ethylenically unsaturated carboxylate, and various ionomer resins have been reported.

However, when the ionomer resin is used for a cover of current golf balls, a thickness of the cover is generally limited to 2.4 mm or less. This is because impact force which causes effects on shot feeling is compromised with impact resilience which causes effects on flight distance. If a design of a golf ball is made causing enlargement of flight distance, the impact force is naturally increased and the shot feel is bad, because the impact force when hitting is in proportion to the impact resilience. Therefore, the thickness of the cover was set at 2.4 mm or less as described above. Accordingly, there is a fixed limit to improve the shot feel to good by reducing the impact force and to improve the flight performances by enhancing the impact resilience.

Japanese Laid-Open Patent Publication No. 5 (1993)-123422 proposes that in order to enhance impact resilience, a thickness of the cover is made larger than that of the current solid golf ball while keeping impact force within a range which is acceptable. However, the above proposal does not simultaneously satisfy both the enhancement of impact resilience and the reduction of impact force.

OBJECTS OF THE INVENTION

The main object of the present invention is to provide a solid golf ball having excellent flight performances by reducing impact force when hitting, improving shot feel and enhancing impact resiliences.

This object as well as other objects and advantages of the present invention will become apparent to those skilled in the art from the following description with reference to the accompanying drawings.

SUMMARY OF THE INVENTION

Figure 1:
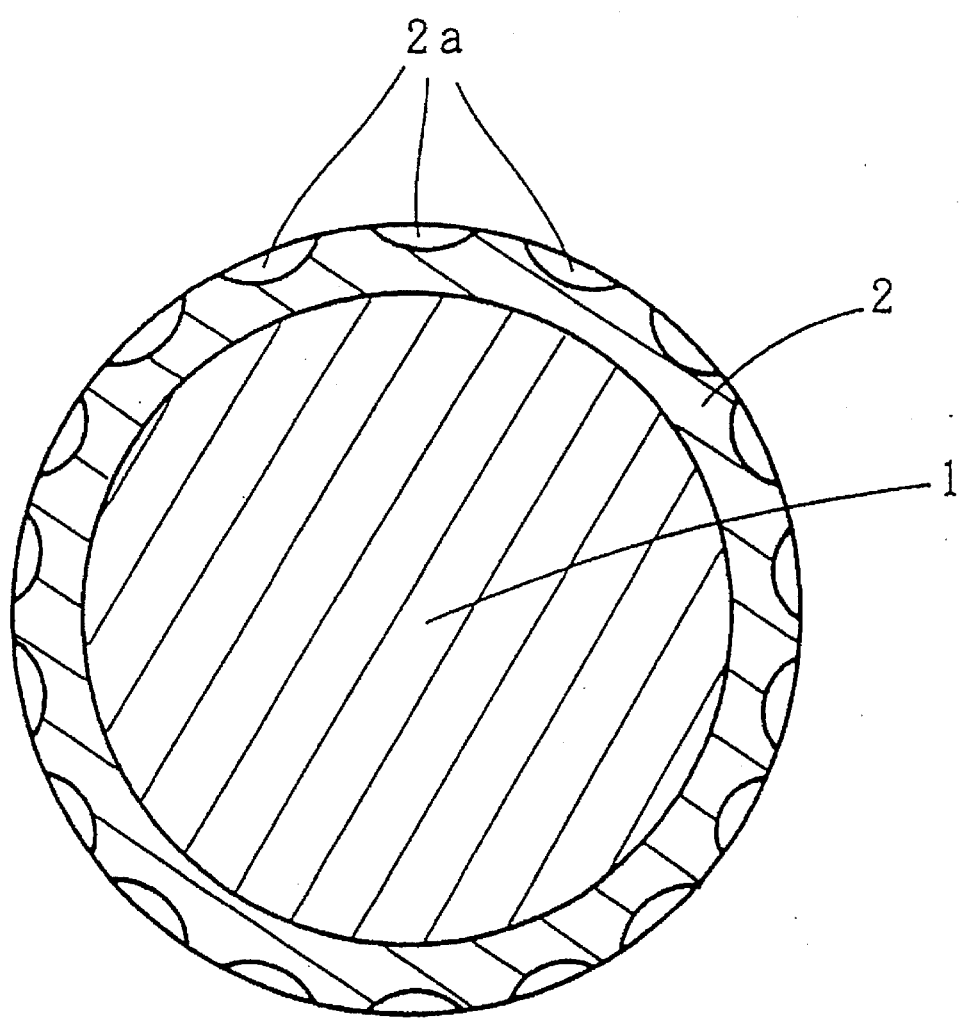
FIG. 1 is a schematic cross section illustrating one embodiment of the golf ball of the present invention.

The present invention has accomplished the above object by constituting a core from a vulcanized molded product of a rubber composition containing a metal salt of an unsaturated carboxylic acid in the amount of 10 to 25 parts by weight based on 100 parts by weight of cis-1,4-polybutadiene so that a deformation amount of the core when a weight load between an initial loading of 10 kg and a final loading 130 kg is 3.5 to 6.5 mm and a stiffness modulus of the cover at 23° C. is 4,500 to 6,000 kg/cm² and, further, a thickness of the cover is 3.2 to 5 mm.

DETAILED DESCRIPTION OF THE INVENTION

In the present invention, the composition of the core, deformation amount of the core, stiffness modulus of the cover and thickness of the cover are essential elements of the present invention as described above. The composition of the core is decided by specifying the deformation amount of the core and, therefore, the deformation amount of the core, thickness of the cover and stiffness modulus of the cover will be explained firstly in the detailed description of the present invention.

In the present invention, the deformation amount of the core is limited to 3.5 to 6.5 mm. The reason is as follows. That is, when the deformation amount of the core is larger than 6.5 mm, the core is too soft. Since the core is too soft when injection molding when the core is covered with the cover, it can not keep roundness. On the other hand, when the deformation amount of the core is smaller than 3.5 mm, the impact force when hitting is larger than that of the current golf ball and a launch angle is low and a spin amount is large, which results in inferior flight performances. It is particularly preferred that the deformation amount of the core is 4.4 to 5.5 mm.

The thickness of the cover is limited to 3.2 to 5 mm. When the thickness of the cover is smaller than 3.2 mm, the resulting golf ball may be the same as the current golf ball. On the other hand, when the thickness of the cover is larger than 5 mm, the impact force when hitting is large, which results in a golf ball having a large spin amount and a low launch angle. Therefore, the flight performances are deteriorated.

Further, the stiffness modulus of the cover is limited to 4,500 to 6,000 kg/cm². The reason is as follows. That is, when the stiffness modulus of the cover is smaller than 4,500 kg/cm², the impact resiliences are deteriorated, which results in deterioration of the flight performances. On the other hand, when the stiffness modulus of the cover is larger than 6,000 kg/cm², the cover is brittle, which results in deterioration of the durability.

In the present invention, the stiffness modulus range mentioned above is generally higher than that of a conventional one. Since the stiffness modulus of the cover is set at a high range, high impact resiliences can be obtained in spite of small impact force when the thickness of the cover is set at 3.2 to 5 mm, which is higher than a conventional one, as described hereinafter. To the contrary, when the stiffness modulus of the cover is 4000 kg/cm², the impact force at the time of hitting is large in proportion to the impact resiliences when the thickness of the cover is increased, as shown in the Comparative Examples described hereinafter. When the thickness of the cover exceeds 4.7 mm, the impact resiliences do not become large in spite of large impact force when hitting. Therefore, characteristics of the present invention, wherein the impact resiliences are high in spite of small impact force when hitting, can not be obtained.

In the present invention, the core is composed of a vulcanized molded product of a rubber composition containing a metal salt of an unsaturated carboxylic acid in the amount of 10 to 25 parts by weight based on 100 parts by weight of cis-1,4-polybutadiene. As the cis-1,4-polybutadiene, so-called high-cis polybutadiene having a cis-1,4-structure of at least 40% or more, preferably 80% or more is preferred. The metal salt of the unsaturated carboxylic acid is normally formulated as a crosslinking agent. As the metal salt of the unsaturated carboxylic acid, for example, there can be used one or more sorts selected from metal salts of acrylic acid such as zinc acrylate, magnesium acrylate, etc.; metal salts of methacrylic acid such as zinc methacrylate, magnesium methacrylate, etc.

When the amount of the metal salt of the unsaturated carboxylic acid is less than 10 parts by weight based on 100 parts by weight of cis-1,4-polybutadiene, the core is soft and the deformation amount of the core is larger than 6.5 mm. On the other hand, when the amount of the metal salt of the unsaturated carboxylic acid is larger than 25 parts by weight based on 100 parts by weight of cis-1,4-polybutadiene, the deformation amount of the core is smaller than 3.5 mm and the impact force when hitting is large. It is particularly preferred that the amount of the metal salt of the unsaturated carboxylic acid is 15 to 20 parts by weight based on 100 parts by weight of cis-1,4-polybutadiene.

As a matter of course, components contained in the rubber composition for core of a normal golf ball can be contained in the rubber composition for forming the core, in addition to the above cis-1,4-polybutadiene and metal salt of the unsaturated carboxylic acid. Examples thereof are organic peroxides as an initiator, fillers, antioxidants, stabilizers, etc.

Examples of the above organic peroxide are dicumyl peroxide, 1,1-bis(t-butylperoxy)-3,3,5-trimethylcyclohexane, 2,5-dimethyl-2,5-di(t-butylperoxy) hexane, di-t-butylperoxide, etc. Among them, dicumyl peroxide is particularly preferred. An amount of this organic peroxide to be formulated is preferably 0.3 to 3 parts by weight, particularly 1 to 2.5 parts by weight, based on 100 parts by weight of the base rubber. Examples of the filler are zinc oxide, barium sulfate, calcium carbonate, hydrous silicate, etc. An amount of the filler (e.g. zinc oxide, etc.) to be formulated is preferably 10 to 50 parts by weight, particularly 20 to 40 parts by weight, based on 100 parts by weight of the base rubber, although it is used so as to adjust a specific gravity. Further, the above base rubber is composed of cis-1,4-polybutadiene or a mixture obtained by mixing the cis-1,4-polybutadiene with a small amount of other rubber. Examples of the rubber which can be mixed are cis-1,4-polyisoprene, styrene-butadiene rubber, ethylene-propylene rubber, ethylene-propylene-diene rubber, chloroprene rubber, etc. It is preferred that the amount of these rubbers is not more than 10% by weight based on the total amount of the base rubber.

The core can be obtained by subjecting the above rubber composition to vulcanization (crosslinking) molding in a mold. The kneading condition when preparing the rubber composition for core and vulcanization condition of the composition for core are known to persons skilled in the art, but the vulcanization is normally conducted at a temperature of 140° to 180° C. for 15 to 55 minutes. Further, no sulfur is used for the above vulcanization, but it is expressed as "vulcanization" according to the term in this industry.

The cover is formed by covering the core with a cover composition comprising a mixture of various ionomers as a main material. In addition, additives such as pigments (e.g. titanium dioxide, barium sulfate, etc.), antioxidants, fluorescent brighteners, etc. can be appropriately contained in the above composition for cover. Examples of the suitable ionomer resin are Hi-milan 1706, Hi-milan 1 707, Hi-milan 1605 and Hi-milan AM7315 (trade name), which are commercially available from Mitsui Du Pont Polychemical. Co., Ltd., and Iotek 8000 (trade name), which is commercially available from Exxon Chemical Co. The ionomer resin is not limited to these resins.

Next, the structure of the golf ball of the present invention will be explained with reference to the accompanying drawing.

FIG. 1 is a schematic cross section illustrating one embodiment of the golf ball of the present invention. In FIG. 1, 1 is a core, 2 is a cover, and 2a is a dimple.

The core is composed of a vulcanized molded product of a rubber composition containing a metal salt of an unsaturated carboxylic acid in the amount of 10 to 25 parts by weight based on 100 parts by weight of cis-1,4-polybutadiene. The deformation amount of the core 1 when a weight load between an initial loading of 10 kg and a final loading 130 kg is 3.5 to 6.5 mm. In FIG. 1, the core 1 is shown as that of a single-layer structure, but the core 1 may be that of a multi-layer structure (two or more layers) if it has the above characteristics. The cover 2 is formed of a cover composition having a stiffness modulus of 4,500 to 6,000 $kg/cm^2$ at 23° C., and the thickness is 3.2 to 5 mm.

A method of covering the cover 2 on the core 1 is not specifically limited, but may be the same method as a conventional method. For example, there can be used a method comprising molding a cover composition into a semi-spherical half-shell in advance, covering a core with two half-shells and then subjecting to a pressure molding at 100° to 170° C. for 1 to 15 minutes, or a method comprising subjecting the cover composition to an injection molding directly on the core to cover the core. In case of cover molding, a dimple 2a may be optionally formed on the surface of the golf ball.

A suitable number and arrangement of the above dimple 2a may be optionally formed on the cover 2 of the golf ball, or formed so as to obtain desired characteristics. In addition, a paint finishing and stamping may be optionally provided on the surface of the golf ball.

As explained above, according to the present invention, there is provided a solid golf ball having small impact force when hitting, good shot feel and excellent flight performances.

EXAMPLES

The following Examples and Comparative Examples further illustrate the present invention in detail but are not to be construed to limit the scope thereof.

Examples 1 to 7

A rubber composition was prepared according to the core formulation shown in Table 1 and the resulting rubber composition for core was subjected to vulcanization molding in a mold at 165° C. for 25 minutes to produce a core. The deformation amount of the resulting core was measured. The results are shown in Table 1.

In addition, a cover composition was prepared according to the cover formulation shown in Table 1. The resulting cover composition was subjected to injection molding directly on the core to cover the core with a cover to produce a golf ball having an outer diameter of 42.7 mm. The stiffness modulus and thickness of the cover are shown in Table 1.

Further, the amount of each component in the tables is represented by parts by weight, and it is also the same in the following tables. In addition, the deformation amount of the core is that formed between initial loading (10 kg) and final loading (130 kg). The stiffness modulus of the cover is measured at 23° C. by a stiffness modulus tester (manufactured by Toyo Seiki Co., Ltd.), and a sample for measuring the stiffness modulus is produced by subjecting the cover composition to press molding to form into a sheet. The sheet was used after standing at 23° C. and humidity of 50% for 2 weeks.

In addition, in Examples 1 to 7, the outer diameter of the golf balls are the same (42.7 mm). The diameter of the core was allowed to vary within a range of 33.3 to 36.3 mm depending on the thickness of the cover, because the thickness of the cover is changed as shown in Table 1.

TABLE 1

| | Example No. | | | | | | |
|---|---|---|---|---|---|---|---|
| | 1 | 2 | 3 | 4 | 5 | 6 | 7 |
| Core formulation: | | | | | | | |
| BR-11 *1 | 100 | 100 | 100 | 100 | 100 | 100 | 100 |
| Zinc acrylate | 20 | 20 | 15 | 15 | 15 | 15 | 15 |
| Zinc oxide | 33 | 31 | 28 | 33 | 38 | 28 | 33 |
| Dicumyl peroxide | 1 | 1 | 1 | 1 | 1 | 1 | 1 |
| Deformation amount of core (mm) | 4.6 | 4.6 | 5.4 | 5.7 | 5.5 | 5.4 | 5.7 |
| Cover formulation: | | | | | | | |
| Iotek 8000 *2 | 50 | 50 | 50 | 50 | 50 | 80 | 0 |
| Hi-milan AM7315 *3 | 50 | 50 | 50 | 50 | 50 | 20 | 100 |
| Titanium dioxide | 2 | 2 | 2 | 2 | 2 | 2 | 2 |
| Stiffness modulus (kg/cm$^2$) | 4800 | 4800 | 4800 | 4800 | 4800 | 5800 | 4500 |
| Thickness of cover (mm) | 3.8 | 3.5 | 3.2 | 4.1 | 4.7 | 3.2 | 4.1 |

*1: BR-11 (trade name), hi-cis polybutadiene having 96% of a cis-1,4 structure, manufactured by Nihon Synthetic Rubber Co., Ltd.
*2: Iotek 8000 (trade name), ethylene-acrylic acid copolymer ionomer obtained by neutralizing with a sodium ion, manufacture by Exxon Chemical Co., stiffness modulus: about 4,000 kg/cm$^2$
*3: Hi-milan AM7315 (trade name), ethylene-methacrylic acid copolymer obtained by neutralizing with a zinc ion, manufactured by Mitsui Du Pont Polychemical Co., stiffness modulus: about 4,500 kg/cm$^2$ The ball hardness (PGA indication), impact force, resilience coefficient, flight performances (e.g. launch angle, spin performances, carry, etc.) and durability of the resulting golf ball were examined. The results are shown in Tables 2 and 3. The measuring methods of the impact force, resilience coefficient and flight performances are as follows.

Impact force:

It is measured by attaching a No. 1 wood club equipped with a device for measuring acceleration at the rear part to a swing robot manufactured by True Temper Co., hitting a golf ball at a head speed of 45 m/second to measure an acceleration to be generated in a direction opposite to a running direction of the head, and then converting a maximum value of the acceleration into an impact force. The results are indicated as an index in case of the value of the golf ball of Example 1 being 100. The smaller the impact force index, the smaller the impact force, the softer the shot feel, the better.

Resilience coefficient:

A ball velocity is measured when a cylindrical metal (198.4 g) is struck against a golf ball at a speed of 45 m/second using a R&A (British Golf Society) initial velocity measuring device to calculate a resilience coefficient.

Flight performances:

A No. 1 wood club is attached to a swing robot (manufactured by True Temper Co.) and a golf ball is hit at a head speed of 45 m/second to measure a distance up to the point where the golf ball is dropped as a flight distance (carry). In addition, a photograph of the hit golf ball was taken to determine a launch angle and spin.

TABLE 2

| | Example No. | | | |
|---|---|---|---|---|
| | 1 | 2 | 3 | 4 |
| Ball hardness (PGA) | 112 | 106 | 89 | 114 |
| Impact force index | 100 | 100 | 89 | 96 |
| Resilience coefficient | 0.803 | 0.797 | 0.797 | 0.807 |
| Flight performances | | | | |
| Launch angle (°) | 10.8 | 10.8 | 10.9 | 10.9 |
| Spin (rpm) | 2500 | 2550 | 2400 | 2500 |
| Carry (yard) | 234 | 235 | 234 | 235 |

TABLE 3

| | Example No. | | |
|---|---|---|---|
| | 5 | 6 | 7 |
| Ball hardness (PGA) | 125 | 100 | 110 |
| Impact force index | 97 | 92 | 93 |
| Resilience coefficient | 0.799 | 0.801 | 0.799 |
| Flight performances | | | |
| Launch angle (°) | 10.9 | 10.7 | 10.9 |
| Spin (rpm) | 2600 | 2600 | 2500 |
| Carry (yard) | 233 | 233 | 235 |

Comparative Examples 1 to 15

A core was produced using a core composition of the formulation shown in Tables 4 to 6. In addition, a cover composition of the formulation shown in Tables 4 to 6 was subjected to injection molding on the core to produce a golf ball having an outer diameter of 42.7 mm. The deformation amount of the core, stiffness modulus of the cover and thickness of the cover are shown in Tables 4 to 6, respectively, according to each formulation. The vulcanization conditions of the core as well as measuring methods of the formation amount of the core and stiffness modulus of the cover are the same as those of Example 1. Further, the details of the ionomer resin used for the cover are shown at the back of Table 6.

TABLE 4

| | Comparative Example No. | | | | |
|---|---|---|---|---|---|
| | 1 | 2 | 3 | 4 | 5 |
| Core formulation: | | | | | |
| BR-11 | 100 | 100 | 100 | 100 | 100 |
| Zinc acrylate | 50 | 50 | 50 | 50 | 50 |
| Zinc oxide | 12 | 17 | 21 | 27 | 32 |
| Dicumyl peroxide | 0.3 | 0.3 | 0.3 | 0.3 | 0.3 |
| Deformation amount of core (mm) | 1.9 | 1.8 | 2.0 | 2.1 | 2.0 |
| Cover formulation: | | | | | |
| Hi-milan 1706 *4 | 30 | 30 | 30 | 30 | 30 |
| Hi-milan 1707 *5 | 30 | 30 | 30 | 30 | 30 |
| Hi-milan 1605 *6 | 40 | 40 | 40 | 40 | 40 |
| Titanium dioxide | 2 | 2 | 2 | 2 | 2 |
| Stiffness modulus (kg/cm$^2$) | 4000 | 4000 | 4000 | 4000 | 4000 |
| Thickness of cover (mm) | 2.3 | 3.2 | 4.1 | 4.7 | 5.5 |

TABLE 5

| | Comparative Example No. | | | | |
|---|---|---|---|---|---|
| | 6 | 7 | 8 | 9 | 10 |
| Core formulation: | | | | | |
| BR-11 | 100 | 100 | 100 | 100 | 100 |
| Zinc acrylate | 36 | 36 | 36 | 36 | 36 |
| Zinc oxide | 17 | 22 | 26 | 31 | 36 |
| Dicumyl peroxide | 0.3 | 0.3 | 0.3 | 0.3 | 0.3 |
| Deformation amount of core (mm) | 2.7 | 2.9 | 2.7 | 2.9 | 2.8 |
| Cover formulation: | | | | | |
| Hi-milan 1706 *4 | 30 | 30 | 30 | 30 | 30 |
| Hi-milan 1707 *5 | 30 | 30 | 30 | 30 | 30 |
| Hi-milan 1605 *6 | 40 | 40 | 40 | 40 | 40 |
| Titanium dioxide | 2 | 2 | 2 | 2 | 2 |
| Stiffness modulus (kg/cm$^2$) | 4000 | 4000 | 4000 | 4000 | |
| Thickness of cover (mm) | 2.3 | 3.2 | 4.1 | 4.7 | 5.5 |

TABLE 6

| | Comparative Example No. | | | | |
|---|---|---|---|---|---|
| | 11 | 12 | 13 | 14 | 15 |
| Core formulation: | | | | | |
| BR-11 | 100 | 100 | 100 | 100 | 100 |
| Zinc acrylate | 15 | 15 | 15 | 15 | 15 |
| Zinc oxide | 25 | 28 | 33 | 38 | 42 |
| Dicumyl peroxide | 1 | 1 | 1 | 1 | 1 |
| Deformation amount of core (mm) | 6.0 | 5.4 | 5.5 | 5.7 | 5.8 |
| Cover formulation: | | | | | |
| Hi-milan 1706 *4 | 30 | 30 | 30 | 30 | 30 |
| Hi-milan 1707 *5 | 30 | 30 | 30 | 30 | 30 |
| Hi-milan 1605 *6 | 40 | 40 | 40 | 40 | 40 |
| Titanium dioxide | 2 | 2 | 2 | 2 | 2 |
| Stiffness modulus (kg/cm$^2$) | 4000 | 4000 | 4000 | 4000 | 4000 |
| Thickness of cover (mm) | 2.3 | 3.2 | 4.1 | 4.7 | 5.5 |

*4: Hi-milan 1706 (trade name), ethylene-methacrylic acid copolymer obtained by neutralizing with a zinc ion, manufactured by Mitsui Du Pont Polychemical Co., stiffness modulus: about 2600 kg/cm$^2$
*5: Hi-milan 1707 (trade name), ethylene-methacrylic acid copolymer obtained by neutralizing with a sodium ion, manufactured by Mitsui Du Pont Polychemical Co., stiffness modulus: about 3800 kg/cm$^2$
*6: Hi-milan 1605 (trade name), ethylene-methacrylic acid copolymer obtained by neutralizing with a sodium ion, manufactured by Mitsui Du Pont Polychemical Co., stiffness modulus: about 3100 kg/cm$^2$ The ball hardness (PG), impact force, resilience coefficient and flight performances of the resulting golf balls were examined according to the same manner as that described in Example 1. The results are shown in Tables 7 to 9.

TABLE 7

| | Comparative Example No. | | | | |
|---|---|---|---|---|---|
| | 1 | 2 | 3 | 4 | 5 |
| Ball hardness (PGA) | 133 | 137 | 141 | 142 | 143 |
| Impact force index | 123 | 124 | 127 | 122 | 120 |
| Resilience coefficient | 0.807 | 0.790 | 0.792 | 0.787 | 0.776 |
| Flight performances | | | | | |
| Launch angle (°) | 10.8 | 11.0 | 10.6 | 10.5 | 10.2 |

TABLE 7-continued

| | Comparative Example No. | | | | |
|---|---|---|---|---|---|
| | 1 | 2 | 3 | 4 | 5 |
| Spin (rpm) | 2850 | 3000 | 3200 | 3250 | 3300 |
| Carry (yard) | 232 | 231 | 229 | 223 | 220 |

TABLE 8

| | Comparative Example No. | | | | |
|---|---|---|---|---|---|
| | 6 | 7 | 8 | 9 | 10 |
| Ball hardness (PGA) | 109 | 119 | 129 | 133 | 135 |
| Impact force index | 104 | 111 | 112 | 112 | 114 |
| Resilience coefficient | 0.785 | 0.785 | 0.787 | 0.780 | 0.773 |
| Flight performances | | | | | |
| Launch angle (°) | 10.8 | 11.0 | 10.4 | 10.1 | 10.0 |
| Spin (rpm) | 2550 | 2700 | 3000 | 3150 | 3200 |
| Carry (yard) | 227 | 226 | 225 | 221 | 220 |

TABLE 9

| | Comparative Example No. | | | | |
|---|---|---|---|---|---|
| | 11 | 12 | 13 | 14 | 15 |
| Ball hardness (PGA) | 49 | 78 | 100 | 111 | 113 |
| Impact force index | 77 | 82 | 89 | 92 | 97 |
| Resilience coefficient | 0.757 | 0.761 | 0.774 | 0.774 | 0.765 |
| Flight performances | | | | | |
| Launch angle (°) | 11.3 | 11.1 | 11.0 | 10.2 | 10.0 |
| Spin (rpm) | 2200 | 2250 | 2550 | 2900 | 3050 |
| Carry (yard) | 225 | 224 | 224 | 220 | 218 |

Comparative Examples 16 to 30

A core was produced using a core composition of the formulation shown in Tables 10 to 12. In addition, a cover composition of the formulation shown in Tables 10 to 12 was subjected to injection molding on the core to produce a golf ball having an outer diameter of 42.7 mm. The deformation amount of the core, stiffness modulus of the cover and thickness of the cover are shown in Tables 10 to 12, respectively, according to each formulation. The vulcanization conditions of the core as well as measuring methods of the formation amount of the core and stiffness modulus of the cover are the same as those of Example 1.

TABLE 10

| | Comparative Example No. | | | | |
|---|---|---|---|---|---|
| | 16 | 17 | 18 | 19 | 20 |
| Core formulation: | | | | | |
| BR-11 | 100 | 100 | 100 | 100 | 100 |
| Zinc acrylate | 50 | 50 | 50 | 50 | 50 |
| Zinc oxide | 12 | 17 | 21 | 27 | 32 |
| Dicumyl peroxide | 0.3 | 0.3 | 0.3 | 0.3 | 0.3 |
| Deformation amount of core (mm) | 1.9 | 1.8 | 2.0 | 2.1 | 2.0 |
| Cover formulation: | | | | | |
| Iotek 8000 | 50 | 50 | 50 | 50 | 50 |
| Hi-milan AM7315 | 50 | 50 | 50 | 50 | 50 |

TABLE 10-continued

| | Comparative Example No. | | | | |
|---|---|---|---|---|---|
| | 16 | 17 | 18 | 19 | 20 |
| Titanium dioxide | 2 | 2 | 2 | 2 | 2 |
| Stiffness modulus (kg/cm$^2$) | 4800 | 4800 | 4800 | 4800 | 4800 |
| Thickness of cover (mm) | 2.3 | 3.2 | 4.1 | 4.7 | 5.5 |

TABLE 11

| | Comparative Example No. | | | | |
|---|---|---|---|---|---|
| | 21 | 22 | 23 | 24 | 25 |
| Core formulation: | | | | | |
| BR-11 | 100 | 100 | 100 | 100 | 100 |
| Zinc acrylate | 36 | 36 | 36 | 36 | 36 |
| Zinc oxide | 17 | 22 | 26 | 31 | 36 |
| Dicumyl peroxide | 0.3 | 0.3 | 0.3 | 0.3 | 0.3 |
| Deformation amount of core (mm) | 2.7 | 2.9 | 2.7 | 2.9 | 2.8 |
| Cover formulation: | | | | | |
| Iotek 8000 | 50 | 50 | 50 | 50 | 50 |
| Hi-milan AM7315 | 50 | 50 | 50 | 50 | 50 |
| Titanium dioxide | 2 | 2 | 2 | 2 | 2 |
| Stiffness modulus (kg/cm$^2$) | 4800 | 4800 | 4800 | 4800 | 4800 |
| Thickness of cover (mm) | 2.3 | 3.2 | 4.1 | 4.7 | 5.5 |

TABLE 12

| | Comparative Example No. | | | | |
|---|---|---|---|---|---|
| | 26 | 27 | 28 | 29 | 30 |
| Core formulation: | | | | | |
| BR-11 | 100 | 100 | 100 | 100 | 100 |
| Zinc acrylate | 15 | 15 | 10 | 20 | 20 |
| Zinc oxide | 25 | 42 | 44 | 31 | 23 |
| Dicumyl peroxide | 1 | 1 | 1 | 1 | 1 |
| Deformation amount of core (mm) | 6.0 | 5.5 | 7.0 | 4.6 | 4.6 |
| Cover formulation: | | | | | |
| Iotek 8000 | 50 | 50 | 50 | 0 | 50 |
| Hi-milan AM7315 | 50 | 50 | 50 | 0 | 50 |
| Hi-milan 1706 | 0 | 0 | 0 | 30 | 0 |
| Hi-milan 1707 | 0 | 0 | 0 | 30 | 0 |
| Hi-milan 1605 | 0 | 0 | 0 | 40 | 0 |
| Titanium dioxide | 2 | 2 | 2 | 2 | 2 |
| Stiffness modulus (kg/cm$^2$) | 4800 | 4800 | 4800 | 4000 | 4800 |
| Thickness of cover (mm) | 2.3 | 5.5 | 3.8 | 4.1 | 2.3 |

The ball hardness(PGA), impact force, resilience coefficient and flight performances of the resulting golf balls were examined as described in Example 1. The results are shown in Tables 13 to 15.

TABLE 13

| | Comparative Example No. | | | | |
|---|---|---|---|---|---|
| | 16 | 17 | 18 | 19 | 20 |
| Ball hardness (PGA) | 136 | 140 | 145 | 147 | 150 |
| Impact force index | 124 | 126 | 127 | 126 | 124 |
| Resilience coefficient | 0.816 | 0.803 | 0.807 | 0.807 | 0.801 |
| Flight performances | | | | | |
| Launch angle (°) | 10.6 | 10.7 | 10.6 | 10.6 | 10.4 |
| Spin (rpm) | 2900 | 3100 | 3050 | 3200 | 3250 |
| Carry (yard) | 231 | 228 | 226 | 225 | 224 |

TABLE 14

| | Comparative Example No. | | | | |
|---|---|---|---|---|---|
| | 21 | 22 | 23 | 24 | 25 |
| Ball hardness (PGA) | 111 | 124 | 135 | 139 | 143 |
| Impact force index | 111 | 112 | 114 | 118 | 119 |
| Resilience coefficient | 0.795 | 0.792 | 0.806 | 0.802 | 0.788 |
| Flight performances | | | | | |
| Launch angle (°) | 10.9 | 10.7 | 10.4 | 10.3 | 11.5 |
| Spin (rpm) | 2550 | 2700 | 3000 | 3150 | 3200 |
| Carry (yard) | 230 | 229 | 228 | 224 | 223 |

TABLE 15

| | Comparative Example No. | | | | |
|---|---|---|---|---|---|
| | 26 | 27 | 28 | 29 | 30 |
| Ball hardness (PGA) | 58 | 130 | 116 | 109 | 72 |
| Impact force index | 79 | 99 | 78 | 98 | 88 |
| Resilience coefficient | 0.773 | 0.76 | 0.780 | 0.785 | 0.776 |
| Flight performances | | | | | |
| Launch angle (°) | 11.0 | 10.1 | 11.0 | 10.9 | 11.2 |
| Spin (rpm) | 2100 | 3150 | 2550 | 2600 | 2200 |
| Carry (yard) | 226 | 222 | 226 | 224 | 227 |

As is apparent from a comparison between the characteristics of the golf balls of Examples 1 to 7 shown in Tables 2 to 3 and those of the golf balls of Comparative Examples 1 to 30 shown in Tables 13 to 15, the golf balls of Examples 1 to 7 showed the impact force index of 89 to 100 and therefore, the impact force was small. Accordingly, the shot feel was good. In addition, the flight distance was large such as 233 to 235 and the launch angle was within a proper range of 10.7° to 10.9°. The spin was also in a proper range of 2400 to 2600 rpm and the flight performances were excellent.

To the contrary, the golf balls of Comparative Examples 1 to 3 showed a large impact force and those of Comparative Examples 4 to 6 showed a small flight distance. That of Comparative Example 7 showed a large impact force and those of Comparative Examples 8 to 15 showed a small flight distance. Those of Comparative Examples 16 to 25 showed a large impact force and those of Comparative Examples 26 to 30 showed a small flight distance.

In addition, as shown in characteristics of the golf balls of Comparative Examples 1 to 15, in case of stiffness modulus of 4000 kg/cm$^2$ as a conventional one, the impact force when hitting is large in proportion to the impact resiliences when the thickness of the cover is increased. When the thickness of the cover exceeds 4.7 mm, the impact resiliences are deteriorated in spite of large impact force when hitting, which results in undesirable characteristics.

What is claimed is:

1. A solid golf ball comprising a core and a cover covering said core, wherein said core is obtained from a rubber composition comprising 100 parts by weight of cis-1,4-polybutadiene and 10 to 25 parts by weight of a metal salt of an unsaturated carboxylic acid, said core has a deformation of 3.5 to 6.5 mm when a weight load from an initial loading of 10 kg to a final loading 130 kg is applied to said core, and said cover has a stiffness modulus of 4,500 to 6,000 kg/cm$^2$ at 23° C. and a thickness of 3.2 to 5 mm.

2. The solid golf ball according to claim 1 wherein said deformation is 4.4 to 5.5 mm.

3. The solid golf ball according to claim 1 wherein said rubber composition further comprises organic peroxides as an initiator, fillers, antioxidants and stabilizers.

4. The solid golf ball according to claim 1 wherein said deformation is about 4.6 mm, said cover has a stiffness modulus of about 4800 kg/cm$^2$, and a thickness from 3.5 to 3.8 mm.

5. The solid golf ball according to claim 1 wherein said deformation is 5.4 to 5.7 mm, said cover has a stiffness modulus of about 4800 kg/cm$^2$, and a thickness from 3.2 to 4.1 mm.

6. The solid golf ball according to claim 2 wherein said cover has a stiffness modulus of about 4800 to about 5800 kg/cm$^2$.

7. The solid golf ball according to claim 2 wherein said cover has a stiffness modulus of about 4800 to about 5800 kg/cm$^2$, and a thickness of about 3.2 to about 4.7 mm.

8. The solid golf ball according to claim 2 wherein the metal salt of an unsaturated carboxylic acid is present in amount of 15 to 20 parts by weight based upon 100 parts by weight of cis-1,4-polybutadiene.

9. The solid golf ball according to claim 2 wherein said metal salt of an unsaturated carboxylic acid is zinc acrylate.

* * * * *